June 7, 1966     J. W. LEATHERS     3,254,732
AIR CUSHION VEHICLE

Filed July 17, 1962     2 Sheets-Sheet 1

United States Patent Office 3,254,732
Patented June 7, 1966

1

3,254,732
AIR CUSHION VEHICLE
John William Leathers, Swindon, England, assignor to Vickers-Armstrongs (Engineers) Limited, London, England, a British company
Filed July 17, 1962, Ser. No. 210,450
Claims priority, application Great Britain, July 18, 1961, 26,022/61
4 Claims. (Cl. 180—7)

This invention relates to vehicles that ride on an air cushion.

According to the present invention there is provided a vehicle adapted to ride on an air cushion sustained at least partially by an air curtain produced by downwardly directed jet means on peripheral parts of the underside of the vehicle, wherein a plenum chamber arranged for receiving air at a pressure greater than atmospheric and open at the bottom is provided on the periphery of the underside of the vehicle outside the jet means.

For a better understanding of the invention and to show how the same may be carried into effect, reference will now be made, by way of example, to the accompanying drawings, in which.

Figure 1:
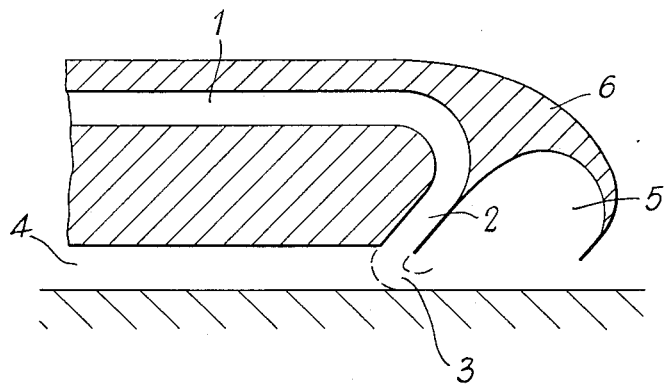
FIGURE 1 is a partial elevated sectional side view of the invention.

The vehicles are all of the kind known under the registered trademark "Hovercraft." A known kind of "Hovercraft" air cushion borne vehicle includes a vehicle body carrying a blower or impeller for supplying air through ducts which discharge from the lower part of the vehicle body and provide an air cushion at the periphery of the vehicle around the air cushion on which the vehicle is supported. Portions of the air delivered into the air curtain flow into the air cushion, while other portions discharge to the atmosphere from under the edge of the lower portion of the vehicle. In each of the vehicles illustrated in FIGURES 1-4 a duct supplies air at an above atmospheric pressure to a downwardly and inwardly directed jet 2 extending around the whole of the peripheral part of the underside of the vehicle. The air issuing from the jet 2 forms an air curtain 3 around the whole of the underside of the peripheral part of the vehicle, the air curtain 3 surrounding and sustaining an air cushion 4 on which the vehicle rides. Some or all of the air in the curtain 3 escapes outwardly into a plenum chamber 5 extending in the embodiments of FIGURES 1 to 4, around the whole of the peripheral part of the vehicle on the outside of the jet 2. The chamber 5 in each case is open at the bottom and is formed by walls as shown including an outer wall 6 which extends outwardly and downwardly from the peripheral portion of the body of the vehicle. The chamber 5 becomes pressurised to a pressure above atmospheric by the air escaping into it from the air curtain 3, and the vehicle in each case is supported partly by the air in the air cushion 4 and partly by the air in the chamber 5.

Figure 2:
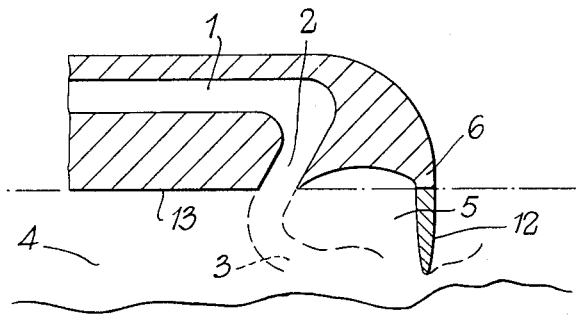
FIGURES 2 and 3 are partial elevated sectional side views of modifications of the invention.
Figure 3:
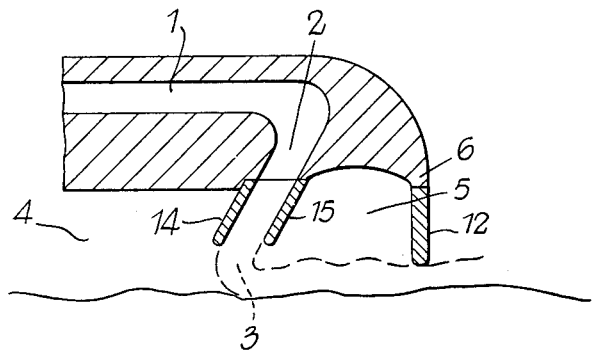

FIGURE 2 illustrates a modified form of the vehicle of FIGURE 1, in which the junction between the side wall 6 and the flexible skirt or curtain 12 is at the same level as the underside 13 of the main part of the vehicle body. Therefore, skirt 12 extends below the underside 13. FIGURE 3 shows the vehicle of FIGURE 2 with the jet tube provided with flexible inner and outer downwardly-directed extensions 14 and 15 of sheet material.

Figure 4:
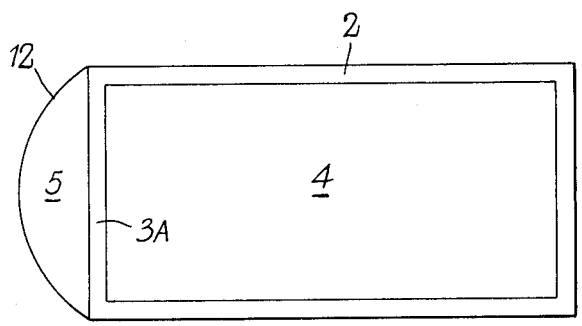
FIGURE 4 is a diagrammatic top view of still another form of the invention.

In all the embodiments described above the jets 2 are inwardly directed and extend around the whole of the peripheral part of the vehicle. However, if desired they may be vertically directed. Furthermore, the jets 2 may not be continuous around the whole of the peripheral part of the vehicle, but only extend around a proportion of the periphery. In addition the plenum chamber 5 may not extend around the whole periphery of the vehicle. For example, FIGURE 4 shows a vehicle like that of FIGURES 2 and 3 in which the flexible skirt or curtain 12 is provided solely at the bow of the vehicle. The curtain 12 and the front part 3A of the air curtain enclose a plenum chamber 5 that in plan view is the shape of a segment of a circle.

I claim:

1. In a vehicle including a vehicle body and of the type adapted to ride on an air cushion located below the vehicle body and maintained at a pressure above atmospheric and sustained at least in part by an air curtain located adjacent to but inwardly of the periphery of the vehicle, and in which said air curtain is formed by air jets directed downwardly from an air jet means located on the peripheral portions of the vehicle, the improvement comprising means defining a plenum chamber located adjacent to the periphery of the vehicle and outwardly of the air curtain and outside the air jet means, said plenum chamber being defined in part by an outer wall at the periphery of the vehicle and being closed at the top and open at its bottom, said plenum chamber during operation of the vehicle receiving air from the air cushion at a pressure greater than atmospheric and also delivering air beneath the lower edge of said outer wall.

2. A vehicle as claimed in claim 1, in which the jet means is provided with flexible spaced inner and outer downwardly-directed walls of sheet material.

3. A vehicle as claimed in claim 1, in which the said outer wall of the plenum chamber comprises a depending flexible skirt extending below the bottom of the vehicle body.

4. A vehicle as claimed in claim 1, in which the air jet means includes spaced inner and outer walls of sheet material extending downwardly below the underside of the body of the vehicle, and in which the outer part of the plenum chamber comprises a depending flexible skirt projecting downwardly with its lower edge below the bottom of the body of the vehicle.

References Cited by the Examiner
UNITED STATES PATENTS
2,814,064  11/1957  Montgomery _____ 180—7
FOREIGN PATENTS
1,240,721  8/1960  France.

MILTON BUCHLER, Primary Examiner.

PHILIP ARNOLD, A. HARRY LEVY, Examiners.

R. M. WOHLFARTH, L. C. HALL,
Assistant Examiners.